United States Patent
Spitz et al.

(10) Patent No.: US 6,783,065 B2
(45) Date of Patent: Aug. 31, 2004

(54) PURCHASING CARD TRANSACTION RISK MODEL

(75) Inventors: Clayton P. Spitz, Houston, TX (US); Todd M. Anderson, Katy, TX (US); Thomas F. Latham, Pearland, TX (US); David C. Guerin, Houston, TX (US); Ernest J. Arbour, Jr., Katy, TX (US)

(73) Assignee: First Data Corporation, Englewood, CO (US)

( * ) Notice: Subject to any disclaimer, the term of this patent is extended or adjusted under 35 U.S.C. 154(b) by 86 days.

(21) Appl. No.: 09/804,674

(22) Filed: Mar. 12, 2001

(65) Prior Publication Data

US 2002/0139837 A1 Oct. 3, 2002

(Under 37 CFR 1.47)

(51) Int. Cl.[7] ................................................. G06K 5/00
(52) U.S. Cl. ........................ 235/380; 235/376; 235/382; 235/383; 705/35; 705/38; 705/39
(58) Field of Search ................................. 235/379, 380, 235/383; 705/38, 44

(56) References Cited

U.S. PATENT DOCUMENTS

| | | | |
|---|---|---|---|
| 4,812,628 A | | 3/1989 | Boston et al. |
| 5,177,342 A | | 1/1993 | Adams |
| 5,357,563 A | | 10/1994 | Hamilton et al. |
| 5,448,047 A | | 9/1995 | Nair et al. |
| 5,671,279 A | * | 9/1997 | Elgamal ........................ 380/23 |
| 5,679,940 A | * | 10/1997 | Templeton et al. .......... 235/380 |
| 5,819,226 A | | 10/1998 | Gopinathan et al. |
| 5,883,810 A | * | 3/1999 | Franklin et al. ............. 700/232 |
| 5,930,762 A | * | 7/1999 | Masch ............................. 705/7 |
| 5,988,497 A | | 11/1999 | Wallace |
| 6,018,723 A | * | 1/2000 | Siegel et al. .................. 705/38 |
| 6,029,154 A | * | 2/2000 | Pettitt ............................ 705/44 |
| 6,119,103 A | * | 9/2000 | Basch et al. ................... 705/35 |
| 6,154,729 A | * | 11/2000 | Cannon et al. ................ 705/35 |
| 6,216,115 B1 | * | 4/2001 | Barrameda et al. ........... 705/40 |
| 6,332,134 B1 | * | 12/2001 | Foster ........................... 705/39 |
| 6,516,056 B1 | * | 2/2003 | Justice et al. ................ 379/145 |

OTHER PUBLICATIONS

Steve Schott et al., "The plastic thief: preventing credit card fraud" Dialog File 148: Gale Group Trade Industry DB; 07947406 Supplier No. : 17110678, pp. 1–9.

* cited by examiner

Primary Examiner—Michael G. Lee
Assistant Examiner—Ahshik Kim
(74) Attorney, Agent, or Firm—Brooks Kushman P.C.

(57) ABSTRACT

A method for quantifying risk of fraud associated with a purchasing card transaction includes obtaining a charge-back history associated with a consumer involved in the purchasing card transaction; and determining a risk score based on the charge-back history. In one embodiment of the invention, the step of obtaining a charge-back history includes obtaining a reason code for each charge-back included in the charge-back history.

30 Claims, 1 Drawing Sheet

PURCHASING CARD TRANSACTION RISK MODEL

BACKGROUND OF THE INVENTION

1. Field of the Invention

The present invention relates to a method and system for quantifying risk of fraud associated with a purchasing card transaction based on charge-back history associated with a consumer involved in the transaction.

2. Background Art

Purchasing cards such as credit cards, department store cards, calling cards, and the like have gained widespread use. Such purchasing cards have many advantages. For example, they allow a consumer or cardholder to make expensive purchases without having large sums of money on hand. Unfortunately, purchasing cards have increasingly become a vehicle to commit fraud. It is estimated that the total cost of purchasing card fraud is $1.3 million for every 1 million active accounts.

At least two conditions must be met before a purchasing card transaction can be completed. First, the cardholder must possess a valid purchasing card. Second, the merchant must be authorized to accept the purchasing card as payment for goods and/or services, and to receive payment from the organization that issued the purchasing card.

Typically, purchasing card transactions involve third party purchasing card transaction processors in addition to the merchant and the purchasing card issuer. Transaction processors are typically independent business institutions that provide merchants with data processing services to facilitate the flow of purchasing card transaction data, and the corresponding payment of money, between the merchants and card issuers. The flow of transaction data from the merchant to a card issuer via a transaction processor is commonly referred to as processing or clearing a transaction. The flow of money from the issuer to the merchant via a processor is known as settlement.

For a typical purchasing card transaction, a cardholder presents a purchasing card to a merchant who records the transaction by using an electronic terminal or a manually imprinted sales draft. Alternatively, if the cardholder is making a purchase via the Internet, then the transaction may be recorded via a website. Generally, the recorded data includes purchase amount, the cardholder's account number, expiration date of the purchasing card, and a merchant verification number.

Typically, at the end of a particular day, the merchant determines the total dollar volume of the purchasing card transactions completed and prepares a deposit slip indicating the amount. All the transaction data is then transmitted to the merchant's transaction processor, and entered into a computer of the transaction processor. This transfer may be electronic, in which case a data capture terminal may be used to transfer the data directly to the computer of the transaction processor. Alternatively, the transfer may involve the deposit of imprinted paper, such as sales drafts, and subsequent entry of the data into the computer of the transaction processor by data entry personnel.

Although purchasing cards provide significant convenience for both cardholders and merchants, there are also well known risks associated with purchasing card transactions. The principal risk is loss resulting from fraudulent or unauthorized use of a purchasing card. Such losses must be absorbed by the merchant, the transaction processor and/or the card issuer.

Over the years, card issuers and merchants have relied on several different methods to protect themselves from fraud or misuse, and to verify the validity of a purchasing card before completing a transaction. For example, card issuers may provide "warning bulletins" to merchants. Warning bulletins are booklets that list the account numbers of purchasing cards that should no longer be accepted. Account numbers may be included on these lists if the purchasing card has been reported lost or stolen, if the cardholder has exceeded his or her credit limit or has become delinquent in payments to the issuer, if the account has experienced excessive charge-backs, or if the purchasing card should not be accepted for another reason (such as mistakenly issued cards and cards that are invalid outside their country of origin).

More recently, card issuers and card issuing associations have provided real-time access to computer databases. This allows merchants to receive telephonic authorization for a transaction based on a search of a continually updated database, which may include similar information as described above with respect to warning bulletins. For a typical transaction authorization, the merchant obtains an authorization code or authorization indicia from an authorization institution or source via telephone or computer terminal. Authorization sources include card issuing associations, card issuers, as well as transaction processors that also provide clearing and settlement services between merchants and card issuers.

Several different methods are currently used for obtaining authorizations. In one method, a merchant uses a telephone to call an authorization source and provide transaction data. An operator associated with the authorization source enters the transaction data into a computer, and provides an authorization number or code to the merchant if the transaction is authorized. Some authorization sources also have audio response units that respond to dual tone multiple frequency signals entered from the merchant's telephone. In this way, the merchant may directly enter numeric transaction data into a computer, and receive an authorization number if the transaction is authorized.

Some transaction processors and card issuers provide an electronic terminal that reads the account number and expiration date from a magnetic strip on the purchasing card. Once the merchant enters the purchased amount into the terminal, the terminal automatically dials an authorization source host computer and initiates an authorization request. The terminal displays and/or stores an authorization code if the transaction is authorized. In each case, the approval code is recorded along with other transaction data.

Authorization sources may also provide risk modeling for quantifying risk of fraud associated with purchasing card transactions. Generally, such risk modeling includes evaluating a plurality of factors, and assigning a risk score for a particular transaction that is indicative of the probability that the transaction is fraudulent. The factors that are evaluated may be related to characteristics of the cardholder or purchasing card involved in the transaction, such as last usage, data of issue and card status. Each factor is typically assigned a risk score, and the individual risk scores are combined to obtain an overall risk score. The overall risk score is then forwarded to a requesting merchant, who may then determine whether to complete the transaction.

SUMMARY OF THE INVENTION

The present invention provides a method and system for quantifying risk of fraud based on charge-back history. Consequently, the method and system provide mor accurate results than prior art risk-modeling methods and systems.

Under the invention, a method for quantifying risk of fraud associated with a purchasing card transaction includes obtaining a charge-back history associated with a consumer involved in the purchasing card transaction; and determining a risk score based on the charge-back history.

The step of obtaining a charge-back history may include obtaining a reason code for each charge-back included in the charge-back history. Furthermore, the method may include weighting each charge-back included in the charge-back history based on the corresponding reason code. As a result, charge-backs that are more indicative of fraud may be given greater weight than other charge-backs less indicative of fraud, such as a charge-back initiated by a card issuer because the associated merchant failed to timely clear the transaction.

The method may also include obtaining additional charge-back history associated with a machine identification number of a machine involved in the purchasing card transaction. For example, if a personal computer is being used in the purchasing card transaction, charge-back history associated with an identification number of the computer may be obtained and considered.

The step of determining a risk score may be performed in any suitable manner. For example, the risk score may be determined using a linear risk model, a regression risk model, a decision tree risk model, and/or a neural network risk model. Furthermore, other purchasing card transaction characteristics may also be considered, such as card age, card status, card last use, etc.

Further under the invention, a system for quantifying risk of fraud associated with a purchasing card transaction includes an authorization source for obtaining a charge-back history associated with a consumer involved in the purchasing card transaction, the authorization source including a risk model for determining a risk score based on the charge-back history.

In one embodiment of the system, the authorization source includes a database for storing a reason code for each charge-back included in the charge-back history, and a processor in communication with the database and including the risk model. Furthermore, the risk model includes instructions for determining the risk score based on the reason codes.

The above features, benefits and advantages and other features, benefits and advantages of the present invention are readily apparent from the following detailed description of the best mode for carrying out the invention when taken together with the accompanying drawings.

DETAILED DESCRIPTION OF THE PREFERRED EMBODIMENT(S)

Figure 1:
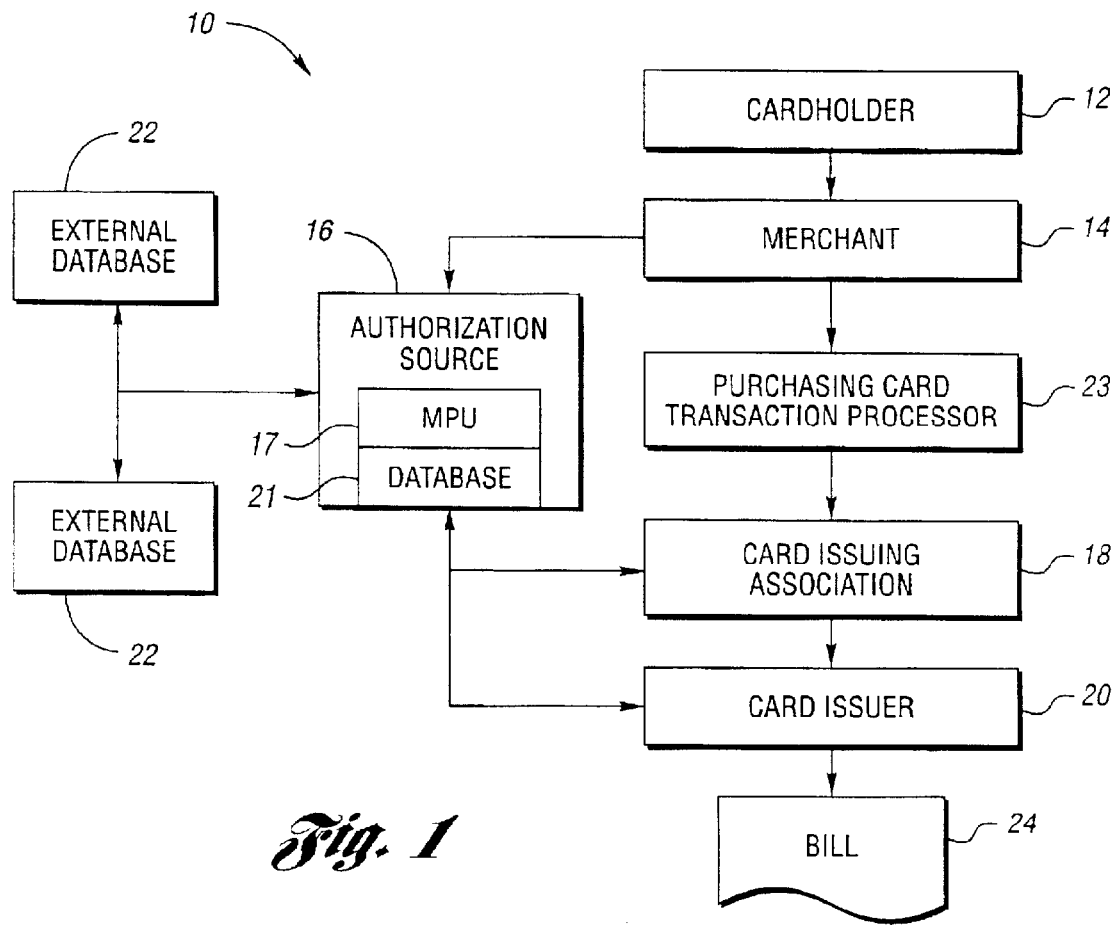
FIG. 1 is a block diagram of a system for conducting a purchasing card transaction in accordance with the present invention.

Before turning to a description of the disclosed embodiments, several terms used throughout this disclosure are defined below in detail.

A purchasing card can mean a debit card, a credit card, or other financial account card. Such purchasing cards typically have a magnetic strip carrying an account number associated with the card, expiration date, issuing institution, and other information, as well as a visible indication of an account number and other information in an area of embossed characters. The terms purchasing card, credit card, etc. are used interchangeably hereinafter.

A merchant is an institution that renders goods or services in exchange for payment, but also can include other types of institutions that rely upon information provided to them by way of purchasing cards. For example, health service providing institutions that receive information on patients via purchasing cards may be considered merchants.

A purchasing card transaction is a transaction typically involving the exchange of information and/or goods and/or services and/or money between a card holding consumer and a goods or services provider, such as a merchant.

A transaction processor is an institution that processes purchasing card transactions, for example, a credit card transaction processing company. Transaction processors are sometimes independent third-party institutions that are not related to any particular credit card issuer. However, since many card issuing associations and card issuers also process transactions, card issuing associations and card issuers are generally included within the term transaction processors, except where a distinction between the institutions is required.

A card issuing association is an institution or other entity that issues regulations or requirements governing a particular brand of purchasing card, such as Visa, MasterCard, American Express, Discover, and the like. Some card issuing associations called bank card associations typically include member banks that actually issue credit cards, such as Visa and MasterCard bank card associations. Other non-bank entities, such as American Express, are included within the term for purposes of this invention. Card issuing associations typically accumulate transaction data from transaction processors and send it to particular card issuers.

A card issuer, as used herein, is an institution or organization, often a bank, that issues a purchasing card, such as debit or credit card. Card issuers are generally members of a card issuing association. However, the term card issuer and card issuing association are sometimes used synonymously when the context suggests an entity that is responsible for issuance of purchasing cards as well as regulation of transactions involving purchasing cards.

Settlement refers to the process by which funds are transferred from a card issuer to a merchant.

Clearing a transaction refers to the process by which data pertaining to a merchant's purchasing card transactions are transferred to a card issuer. Transaction clearance is often provided by transaction processors that are independent of a credit card issuer. However, since card issuers may also clear transactions themselves, they are often transaction processors as well.

Authorization indicia, also referred to as authorization codes, authorization approval, or approval code, refers to predetermined signals received from a card issuing association, or other authorization source, that indicate that a particular transaction has been authorized. These indicia may be electronic or may be audible. Furthermore, these indicia are generally associated with other transaction data to flag the transaction as having been pre-approved.

Referral means a signal or predetermined indicia received by a merchant from an authorization source indicative that the merchant should contact the authorization source or a card issuer in connection with a particular transaction. A referral is often generated in response to a determination that a particular purchasing card should not be accepted for various reasons, such as the card holder has exceeded his or her credit limit, the purchasing card has been stolen, or for some other reason.

An audio response unit or ARU is a synthesized voice generating apparatus that responds to dual tone multiple frequency (DTMF) signals provided by a standard touch-tone telephone to enter the account number, expiration date and purchase amount. In addition, the ARU contains circuitry that is capable of recognizing certain spoken words and numbers. If a transaction is approved, the ARU's voice synthesizer provides an approval number and is operative for generating an audible but synthesized voice and message corresponding to a predetermined message. For example, an ARU may be programmed to provide messages, such as transaction authorized, approval code is 12345, or transaction declined. Such messages are generated and relayed to the merchants automatically and telephonically without human intervention or participation.

A retrieval request is a request or inquiry made of a merchant or a merchant's transaction processor, typically from a card holder or card issuer, for a hard copy of documentation associated with a given transaction. Typically a transaction may be charged back to the transaction processor or merchant if the requested documentation is not provided within a time limit set under card issuing association regulations.

Referring now to FIG. 1, an overview of a system 10 according to the present invention for processing and settling purchasing card transactions is illustrated. Such purchasing card transactions may include any transaction involving a purchasing card, such as a mail-order transaction, telephone-order transaction, electronic transaction initiated over the Internet, and/or a transaction initiated at a merchant location. Generally, a consumer, such as cardholder 12, who desires to purchase goods and/or services, provides a purchasing card or an account number associated with the purchasing card to a merchant 14 as a method of payment. The merchant 14 communicates with an authorization source 16 to request transaction authorization and a risk assessment for quantifying the risk of fraud associated with the particular transaction.

The Authorization source 16 preferably includes a computer system having necessary hardware and/or software for authorizing the transaction and for performing the risk assessment. For example, authorization source 16 may have a processor, such as a microprocessor 17, that includes necessary instructions for authorizing the transaction and for performing the risk assessment. Authorization source 16 may also communicate with one or more card issuing associations, such as card issuing association 18, and/or one or more card issuers, such as card issuer 20, so as to obtain information for determining whether to authorize the transaction and/or for performing the risk assessment. The Authorization source 16 may also obtain information from an internal database 21 and/or one or more external databases 22 for use in performing the risk assessment, as explained below in greater detail.

The authorization source 16 may be an independent institution, a card issuing association, a card issuer, and/or a transaction processor. Some merchants may also function as their own authorization source. Furthermore, it should be understood that one authorization source may be used to obtain transaction authorization, and another authorization source may be used to obtain the risk assessment.

If the transaction is approved, the authorization source 16 may provide the merchant 14 an authorization number. In response to the authorization request, the merchant 14 may instead receive a decline, in which case the transaction is terminated, or a referral, in the event the authorization source 16 requires more information before authorizing the transaction.

After performing the risk assessment, the authorization source 16 may also provide the merchant 14 an overall risk score, which represents the likelihood that the transaction is fraudulent. The merchant 14 may then use the overall risk score to determine whether or not to proceed with the transaction.

Generally, the merchant 14 uses an electronic terminal, such as an ARU described above, or any other suitable terminal, to communicate with the authorization source 16 and to record transaction data pertaining to the transaction. The transaction data may include the account number and expiration date associated with the purchasing card, the amount and date of the purchase, the authorization number, the overall risk score, and the cardholder's signature.

Typically, the merchant transfers the transaction data to a transaction processor 23 at the end of the day, along with other transaction data from other transactions that occurred during the day, so that the transactions may be processed or cleared. Transaction processor 23 separates the transaction data according to type of purchasing card, and forwards the transaction data to card issuing association 18, or other appropriate card issuing associations. The card issuing association 18 accumulates transaction data and sends it to the card issuer 20, or other appropriate card issuers. Once card issuer 20 receives the transaction data associated with the transaction described above, the transaction is posted to the cardholder's account, and a statement or bill 24 is sent to the cardholder 12.

Figure 2:
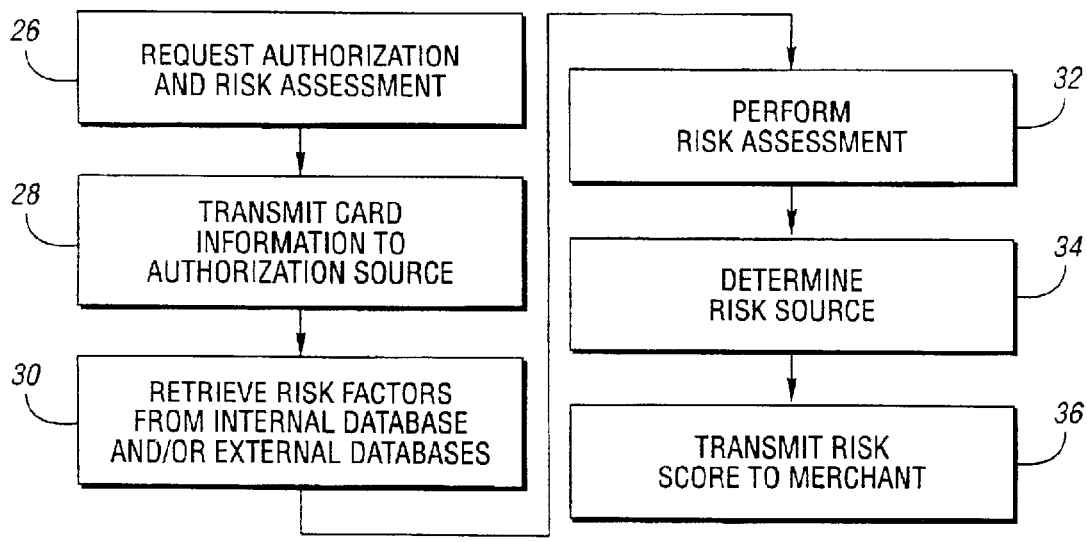
FIG. 2 is a flow diagram illustrating operation of a method, according to the invention, for quantifying risk of fraud associated with a purchasing card transaction.

Referring to FIGS. 1 and 2, an overview of a risk assessment conducted by authorization source 16 in connection with a purchasing card transaction will now be described. First, merchant 14 requests transaction authorization and a risk assessment from the authorization source 16, as represented by block 26. At block 28, merchant 14 transmits purchasing card information associated with the purchasing card to the authorization source 16. Such purchasing card information may include the account number and expiration date associated with the purchasing card, the amount and date of the purchase, and/or other information. Authorization source 16 then retrieves or otherwise obtains a plurality of transaction characteristics, such as risk factors, from internal database 21 of authorization source 16, and/or from one or more external databases 22, as indicated at step 30. Such risk factors may include charge-back history, card age, card status, card last use, card watch list, etc., and are preferably stored at least temporarily on the internal database 21.

Charge-back history includes information on charge-backs associated with cardholder 12. For example, charge-back history may include information on charge-backs associated with the purchasing card being used in the current transaction and/or charge-backs associated with another purchasing card for which the cardholder 12 is an authorized user. As another example, charge-back history may include information on charge-backs associated with an address, telephone number and/or e-mail address of the cardholder 12. Charge-back history may also include information on charge-backs otherwise associated with the cardholder 12 and/or other aspects of the transaction, such as a ship to address, a telephone number of a telephone that is used to initiate the transaction (which may be captured or otherwise obtained by a caller identification device), or a machine identification number. For instance, if the cardholder 12 is attempting to purchase products or services over the Internet using a personal computer, authorization source 16 may capture the machine identification number of the personal computer and then obtain charge-back history associated with the identification number.

A charge back occurs when a card issuing association or card issuer refuses to honor a particular transaction, and results in reversal of the transaction to a transaction processor or merchant. For example, a cardholder may request a charge back if a particular transaction was not authorized by the cardholder, or if the product or service was not provided in accordance with the sale terms. As another example, the card issuing association or card issuer may automatically charge back a particular transaction if the merchant failed to clear the transaction in a timely manner.

Charge-back history preferably includes the number of charge-backs, the dollar amount of each charge-back, and a reason code for each charge-back associated with the cardholder 12 and/or other aspect of the transaction. The reason code is a code, such as a number, letter or alpha-numeric symbol, that indicates the reason for the charge-back. For example, the reason code may indicate that the cardholder 12 was dissatisfied with a previously purchased product or service, or that the cardholder 12 never ordered the product or service. As another example, the reason code may indicate that a purchasing card association or card issuer charged back a particular transaction because the merchant failed to clear the transaction in a timely manner.

Card age is defined as the length of time the account number associated with the purchasing card has been stored in internal database 21 of the authorization source 16, or in an external database 22. Typically, the lower the card age is, the greater the likelihood that the transaction involves fraud.

Card status is the current status of the purchasing card as recorded in internal database 21 of the authorization source 16, or in an external database 22. For example, the card status may be "retrieval issued". A retrieval is a request for information regarding a transaction from a card issuer. Other card statuses may include "consumer block" or "system block". A "consumer block" may be requested by a cardholder so as to block certain transactions, and a "system block" is typically requested by a card issuing association or card issuer so as to block all transactions.

Card last use is the date and time the purchasing card, or the account number associated with the purchasing card, was last used in a transaction. Depending on certain factors, such as transaction type and transaction amount, a recent card last use, for example, may indicate a high probability of transaction fraud.

A card watch list is a listing of purchasing card account numbers that have been reported stolen or are known to be involved in fraudulent activity. Other watch lists, such as a country watch list or an Internet Protocol (IP) watch list may also be obtained and reviewed. A country watch list is a listing of cardholder names and/or purchasing account numbers that have been involved in fraudulent activity in one or more countries. An IP watch list is a listing of cardholder names and/or purchasing account numbers that have been involved in fraudulent activity on one or more web sites.

The authorization source 16, having the current purchasing card information and the risk factors retrieved from the internal and/or external databases 21 and 22, respectively, then performs a risk assessment to quantify risk of fraud associated with the purchasing card transaction, as represented by block 32. The risk assessment may be performed in any suitable manner, such as by using a linear risk model, a regression risk model, a decision tree risk model, a neural network risk model, and/or any other suitable risk model. Furthermore, the authorization source 16 may include a plurality of such risk models, which are preferably contained on suitable hardware and/or software. For example, the microprocessor 17 of the authorization source 16 may include all instructions necessary for executing one or more risk models.

The risk assessment involves evaluating the risk factors identified above, and assessing or otherwise determining an overall risk score, as represented by block 34. The overall risk score represents the likelihood that the transaction is fraudulent, or will later become fraudulent. In one embodiment of the invention, the higher the overall risk score, the greater the likelihood that the transaction is fraudulent. For example, the overall risk score may be a number ranging from zero to ten, where zero represents the lowest likelihood that the transaction is fraudulent, and where ten represents the highest likelihood that the transaction is fraudulent.

With respect to charge-back history, the risk assessment may involve considering the reason code for each charge-back in order to determine what weight should be given to each charge-back. For example, if the reason code for a particular charge-back indicates that a purchasing card association or card issuer initiated the charge-back, then the charge-back may be assigned relatively little weight or disregarded. As another example, a charge-back having a reason code that indicates dissatisfaction with a product or service may be given more weight than a charge-back having a reason code that indicates that the cardholder never ordered a particular product or service.

Alternatively or supplementally, the risk assessment may involve considering how each charge-back is associated with the current transaction in order to determine what weight should given to each charge-back. For example, a charge-back associated with a telephone number of a telephone that is being used to initiate the current transaction may be given more weight than a charge-back associated with a ship to address.

At block 36, the overall risk score for the purchasing card transaction is transmitted to the merchant 14, who may then make a determination as to whether or not to proceed with the transaction. Alternatively, the authorization source 16 may determine that the transaction should be declined based on the overall risk score. In this case, the authorization source 16 may transmit a message or indicia indicating to the merchant 14 that the transaction should be declined or is not authorized.

Because the risk assessment involves evaluating charge-back history, the system and method of the present invention provide more accurate results than prior art systems and methods. Advantageously, the risk assessment may also be modified based on the type of product or service involved in the transaction, and/or based on how the transaction is being performed, e.g., in store purchase, mail order, telephone order, purchase over the Internet, etc. For example, if the transaction involves adult material, such as products or services that are restricted from being sold to persons under the age of 18, or other age set by applicable law, then certain risk factors may be scored differently and/or weighted differently.

With reference to Table 1 shown below, an example of how an overall risk score may be assessed or scored, based on a linear risk model, will now be described. In column A of Table 1, a plurality of risk factors used to determine the risk of a fraudulent transaction are listed. In column B of Table 1, a scoring range for each risk factor is provided. Finally, in column C, an assessed risk score is shown for each risk factor associated with a particular transaction. The risk scores shown in column C are then summed and a overall risk score is determined.

TABLE 1

| A<br>RISK FACTOR | B<br>SCORE RANGE | C<br>CURRENT SCORE |
| --- | --- | --- |
| Card Age | 0–10 | 8 |
| Card Status | 1–10 | 2 |
| Card Last Use | 1–10 | 1 |
| Card Watch List | 0 or 10 | 0 |
| Charge back history | 1–10 | 5 |
|  | OVERALL SCORE | 3.2 |

The first risk factor shown in Table 1 is "Card Age". The card age for a particular purchasing card may fall within one of a plurality of ranges, such as zero to seven days, seven to thirty days, thirty to sixty days, etc. Each range may have an associated risk score that indicates the riskiness of a transaction. The higher the risk score, the higher the probability that the transaction is fraudulent. For instance, if the card age falls within a range of zero to seven days, a high risk score may be assessed, such as a ten. If the card age falls within a range of seven to thirty days, then a lower risk score, such as eight, may be assigned.

The next risk factor shown in Table 1 is "Card Status", which is scored according to the current status of the purchasing card in a particular database. For example, a card status of "retrieval issued" may be assigned a risk score of two. Other card statuses such as "consumer block" and "system block" may be assigned risk scores of seven and ten, respectively. A transaction involving a purchasing card having a status of "consumer block" or "system block" is considered to have a higher likelihood of being fraudulent than a transaction involving a purchasing card having a status of "retrieval issued". Thus, the assigned risk scores for "consumer block" and "system block" are typically higher than for "retrieval issued".

"Card Last Use" is the next risk factor shown in Table 1. If the last use of the purchasing card is very recent, such as within the last minute or hour, then the potential that the transaction is fraudulent may be high. As a result, a risk score of ten may be assigned. However, if the last use of the purchasing card is not recent, such as within the last month, then the potential that the transaction is fraudulent may be low. As a result, a risk score of one may be assigned.

The next risk factor shown in Table 1 is "Card Watch List". If the purchasing card account number is on a card watch list because the associated purchasing card was previously used in a fraudulent transaction, then the potential that the current transaction is fraudulent is high. As a result, a risk score of ten may be assigned. However, if the purchasing card is not on the card watch list, then the potential that the transaction is fraudulent is low. As a result, a risk score of zero may be assigned.

The last risk factor shown in Table 1 is "Charge-back History". If, for example, the purchasing card account number involved in the current transaction has an extensive charge-back history, then the potential that the current transaction is fraudulent is considered to be high. As a result, a risk score of ten may be assigned. However, if the purchasing card account number has little to no charge-back history, then the potential that the current transaction is fraudulent is considered to be low. As a result, a risk score of one may be assigned.

As mentioned above, other charge-backs associated with the cardholder 12, such as charge-backs associated with the name, address and/or telephone number of the cardholder 12, may also be obtained and considered. Furthermore, charge-backs associated with other aspects of the transaction, such as charge-backs associated with a ship to address and/or telephone number of a telephone that is being used to initiate the transaction, may also be obtained and considered.

The reason code associated with each charge-back may also be considered in order to determine what weight should be given to each charge-back. For example, a charge-back having a reason code that indicates fraud, may be weighted twice as much as a charge-back having a reason code that indicates that the cardholder was dissatisfied with a purchased product or service.

Alternatively or supplementally, the association between each charge-back and the current transaction may also be considered in order to determine what weight should be given to each charge-back. For example, a charge-back associated with a telephone number of a telephone that is being used to initiate the current transaction (which telephone number may be captured by a caller identification device), may be weighted fifty percent more than a charge-back associated with a telephone number provided by the cardholder 12. Furthermore, this weighting may occur before or after weighting based on reason code.

After the charge-backs have been properly weighted, the total number of charge-backs may be compared to predetermined ranges to determine the associated risk score. For example, a range of two to three charge-backs may be assigned a risk score of five, and a range of four to five charge-backs may be assigned a risk score of six.

Many other risk factors, of course, can be used to assess the potential that a particular purchasing card transaction is fraudulent. Additional risk factors can be evaluated and scored in a similar manner as described above in detail.

The overall risk score may be determined based on the risk scores for the risk factors. For example, the overall risk score may be calculated by summing all of the individual scores for the risk factors, and then dividing by the total number of risk factors. Thus, for the example illustrated in Table 1, the overall risk score is 3.2.

Alternatively, the individual risk scores may be weighted differently. For example, the risk score for card watch list or charge-back history may be doubled prior to computing the overall risk score.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for quantifying risk of fraud associated with a purchasing card transaction, the method comprising:

obtaining a charge-back history associated with a consumer involved in the purchasing card transaction;

comparing the charge-back history to predetermined ranges of charge-backs; and determining a risk score based on the comparison of the charge-back history to the predetermined ranges of charge-backs.

2. The method of claim 1 wherein the step of obtaining a charge-back history includes obtaining a reason code for each charge-back included in the charge-back history.

3. The method of claim 2 further comprising weighting each charge-back included in the charge-back history based on the corresponding reason code.

4. The method of claim 3 wherein the step of weighting each charge-back includes giving more weight to a charge-back having a reason code that indicates dissatisfaction with a product or service as compared to a charge-back having a reason code that indicates that the consumer never ordered a particular product or service.

5. The method of claim 3 wherein the step of weighting each charge-back includes giving less weight to a charge-back having a reason code that indicates that a purchasing card association or card issuer initiated the charge-back as compared to a charge-back having a reason code that indicates that the consumer initiated the charge-back.

6. The method of claim 1 further comprising determining how each charge-back included in the charge-back history is associated with the purchasing card transaction, and weighting each charge-back based on the corresponding association with the purchasing card transaction.

7. The method of claim 6 wherein the step of weighting each charge-back includes giving more weight to a charge-back associated with a telephone number of a telephone that is used to initiate the purchasing card transaction as compared to a charge-back associated with a ship to address.

8. The method of claim 6 wherein the step of weighting each charge-back includes giving more weight to a charge-back associated with a telephone number of a telephone that is used to initiate the purchasing card transaction as compared to a charge-back associated with a telephone number provided consumer.

9. The method of claim 1 further comprising obtaining additional charge-back history associated with a machine identification number of a machine involved in the purchasing card transaction, and wherein the step of determining a risk score includes determining the risk score based on the additional charge-back history.

10. The method of claim 1 wherein the step of determining a risk score is performed using a linear risk model.

11. The method of claim 1 wherein the step of determining a risk score is performed using a regression risk model.

12. The method of claim 1 wherein the step of determining a risk score is performed using a decision tree risk model.

13. The method of claim 1 wherein the step of determining a risk score is performed using a neural network risk model.

14. The method of claim 1 wherein the step of determining a risk score includes determining the risk score based on a plurality of purchasing card transaction characteristics.

15. The method of claim 1 wherein a higher range of charge-backs is assigned a higher risk score compared to a lower range of charge-backs.

16. A method for quantifying risk of fraud associated with a purchasing card transaction, the method comprising:

obtaining a charge-back history associated with a consumer involved in the purchasing card transaction, wherein the charge-back history includes charge-backs associated with a particular purchasing card account of the consumer, and a reason code for each charge-back;

weighting each charge-back based on the corresponding reason code; and determining a risk score based on the weighted charge-backs.

17. The method of claim 16 wherein the step of weighting each charge-back includes giving more weight to a charge-back having a reason code that indicates dissatisfaction with a product or service as compared to a charge-back having a reason code that indicates that the consumer never ordered a particular product or service.

18. The method of claim 16 wherein the step of weighting each charge-back includes giving less weight to a charge-back having a reason code that indicates that a purchasing card association or card issuer initiated the charge-back as compared to a charge-back having a reason code that indicates that the consumer initiated the charge-back.

19. A system for quantifying risk of fraud associated with a purchasing card transaction, the system comprising:

an authorization source for obtaining a charge-back history associated with a consumer involved in the purchasing card transaction, the authorization source including a risk model for determining a risk score based on the charge-back history, wherein the risk model includes instructions for comparing the charge-back history to predetermined ranges of charge-backs in order to determine the risk score.

20. The system of claim 19 wherein the authorization source includes a database for storing a reason code for each charge-back included in the charge-back history, and a processor in communication with the database and including the risk model, wherein the risk model includes instructions for determining the risk score based on the reason codes.

21. The system of claim 20 wherein the risk model includes instructions for weighting each charge-back included in the charge-back history based on the corresponding reason code.

22. The system of claim 19 wherein the risk model includes instructions for determining how each charge-back included in the charge-back history is associated with the purchasing card transaction, and instructions for weighting each charge-back based on the corresponding association with the purchasing card transaction.

23. The system of claim 19 wherein the risk model comprises a linear risk model.

24. The system of claim 19 wherein the risk model comprises a regression risk model.

25. The system of claim 19 wherein the risk model comprises a decision tree risk model.

26. The system of claim 19 wherein the risk model comprises a neural network risk model.

27. The system of claim 19 wherein the risk model is configured such that a higher range of charge-backs is assigned a higher risk score compared to a lower range of charge-backs.

28. A computer system for quantifying risk of fraud associated with a purchasing card transaction, the computer system comprising:

a database for storing a charge-back history associated with a consumer involved in the purchasing card transaction, the charge-back history including charge-backs associated with the consumer and a reason code for each charge-back; and a processor in communication with the database, the processor including a risk model that includes instructions for weighting each charge-back based on the corresponding reason code and instructions for determining a risk score based on the weighted charge-backs.

29. The system of claim 28 wherein the instructions for weighting each charge-back include instructions for giving more weight to a charge-back having a reason code that indicates dissatisfaction with a product or service as compared to a charge-back having a reason code that indicates that the consumer never ordered a particular product or service.

30. The system of claim 28 wherein the instructions for weighting each charge-back include instructions for giving less weight to a charge-back having a reason code that indicates that a purchasing card association or card issuer initiated the charge-back as compared to a charge-back having a reason code that indicates that the consumer initiated the charge-back.

* * * * *

UNITED STATES PATENT AND TRADEMARK OFFICE
CERTIFICATE OF CORRECTION

PATENT NO. : 6,783,065 B2
DATED : August 31, 2004
INVENTOR(S) : Clayton P. Spitz et al.

It is certified that error appears in the above-identified patent and that said Letters Patent is hereby corrected as shown below:

Column 10,
Line 62, after "provided" insert -- by the --.

Signed and Sealed this

Eighteenth Day of January, 2005

JON W. DUDAS
*Director of the United States Patent and Trademark Office*